May 3, 1938.  M. J. McANENY  2,115,736
TOOL FOR APPLYING HOSE CLAMPS
Filed Nov. 12, 1936
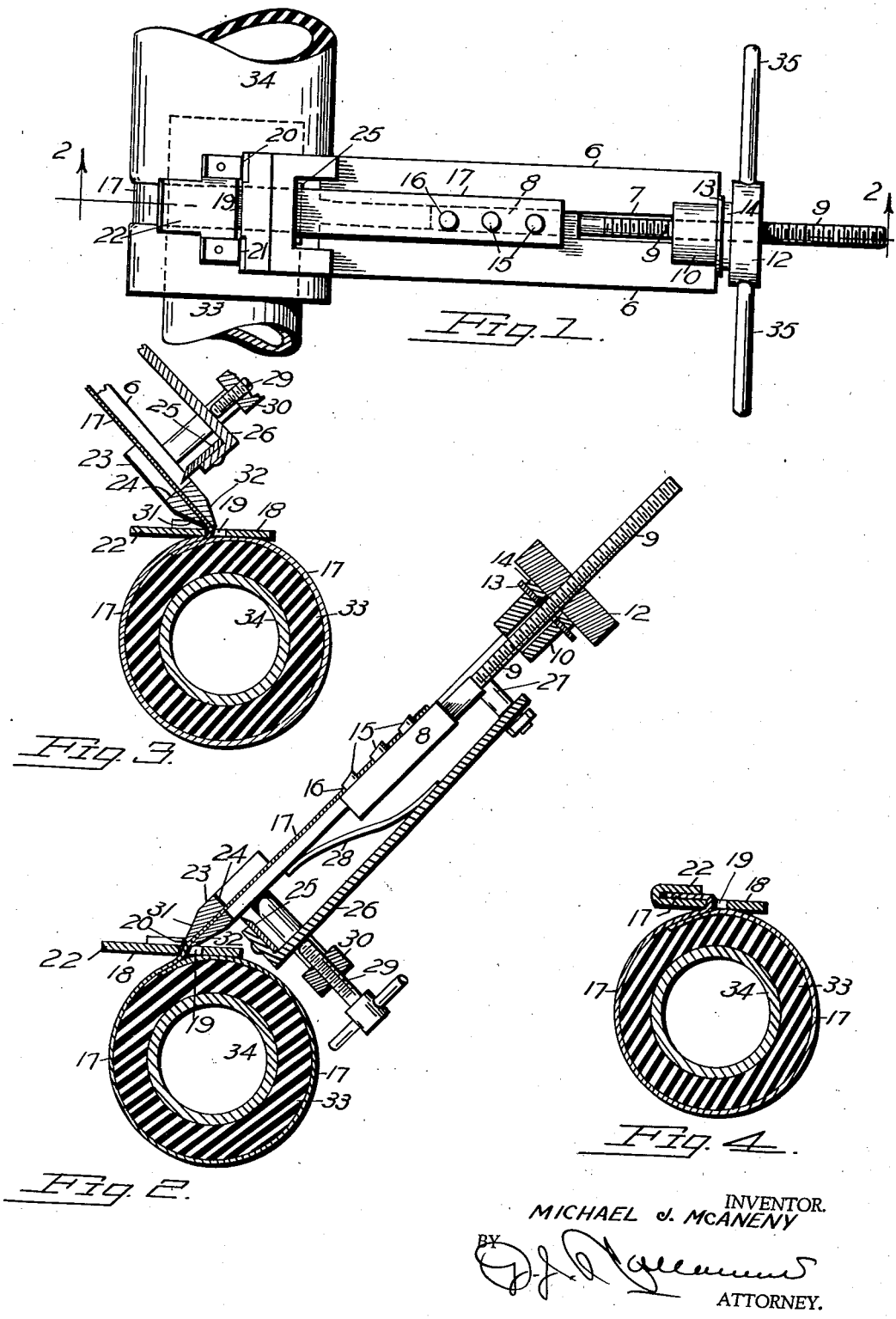
INVENTOR.
MICHAEL J. McANENY
ATTORNEY.

Patented May 3, 1938

2,115,736

UNITED STATES PATENT OFFICE 2,115,736

TOOL FOR APPLYING HOSE CLAMPS

Michael J. McAneny, Denver, Colo., assignor to Michael J. McAneny, Jr., Denver, Colo.

Application November 12, 1936, Serial No. 110,479

5 Claims. (Cl. 81—9.3)

This invention relates to improvements in tools for tightening clamps on to hose connections.

In high-pressure hose lines, there is usually a tendency for leaks to occur where the hose is attached to a pipe-line or other metallic nipple, and usually there is a hazard that the hose may be forced off of its connecting pipe or nipple.

It is, therefore, an object of the present invention to make a tool that will engage and tighten a hose clamp around a hose to effect a permanently tight and safe union of the hose to a pipe or other nipple.

A further object is to provide a tool that will cut off a hose clamp-band to the proper length for locking after the band is tightened.

Another object of this invention is to provide a hose-clamp tool that is small and portable yet efficient for any size of hose.

Other objects and advantages will be more fully disclosed in the following description and in the accompanying drawing wherein like parts have been similarly designated, and in which;

Figure 1 is a plan view of the improved hose-clamp tool in use;

Figure 2 is a sectional view taken along the line 2—2 of Figure 1;

Figure 3 is a sectional view showing a further step in the use of the tool; and

Figure 4 is a sectional view showing the clamp locked in place on a hose.

The tool that is the subject of this application is designed particularly to cooperate with my special clamp-band that is also shown and described herein for purposes of clarity as to the operation of the tool. The clamp-band per se, is the subject of my copending application of even date herewith Serial No. 110,480 and for that reason is not claimed herein.

The tool comprises a frame 6 having a central longitudinal slot 7 in which is mounted a slide 8 attached to a screw 9 that is journaled in a bearing 10 and on which is a hand-nut 12 and thrust washers 13 and 14. The slide is provided with a plurality of projections 15 that cooperate with holes 16 in a clamp-band 17 that is wrapped around a hose 33 and a pipe 34 and has a head 18 provided with a slot 19, shoulders 20 and 21 at either end of the slot, and a tongue 22 in alinement with the band.

One end of the frame is provided with a shear plate 23 spaced from the frame to permit the clamp-band to pass therebetween, and having a shearing edge 24 to cooperate with a cut-off knife 25 carried by an arm 26 that is loosely attached to a post 27 on the frame to permit some relative pivotal movement of the arm. A spring 28 urges the arm away from the frame and a screw 29 threaded through a yoke 30 bears against the back side of the arm and controls its distance away from the frame.

Both the frame and the shear plate are beveled in converging relation at the end of the tool opposite the screw as shown at 31 and 32 respectively.

Operation

In use the clamp-band is wrapped around the hose and drawn through the slotted head, passed through the space between the frame 7 of the tool and the shear plate 23, and then the holes in the band are placed in engagement with the projections 15 on the tool slide 8. The beveled ends of the tool are then rested on the head plate 18 abutting the shoulders 20 and 21 thereon, and as the hand-nut 12 is turned to draw the screw 9 outwardly, the band is tightened around the hose, the head being of sufficient strength to resist the force of the tool and permit the band to be drawn tightly therethrough and the shoulders on the band preventing the tool from slipping along the head.

When the band is drawn tight, the tool is rotated on the head plate 18 as a fulcrum to bend the band over the edge of the slot 19, as illustrated in Figure 3, whereupon the screw 29 is turned to force the arm 26 with its cut-off knife 25 toward the band so that it will be sheared off at 24, leaving just enough of the band extending over the edge of the slot for safe locking purposes. After the band is cut off, the end is pressed down onto head 18 and tongue 22 is bent over to complete the lock as shown in Figure 4.

It will be clearly seen that the improved clamping tool may be used to draw the clamp-band extremely tight around a hose since the arms 35 on the hand-nut 12 provide an advantageous leverage ratio, and the provision of the cut-off knife on the tool promotes an efficient locking arrangement over a wide range of hose diameters yet using one standard band length.

The engaging projection 15 on the tool slide 8 provides a positive anchorage of the tool to the band for the application of the tightening force and the beveled end of the tool makes the band-locking rotation of the tool possible while it is bearing on the head plate of the band, and while retaining the full tension on the band.

The complete tool is small enough to be easily carried to the job and requires no mounting or accessories other than the bands themselves.

What I claim and desire to secure by Letters Patent is:—

1. A tool for drawing a clamp around a hose, comprising a supporting frame, a slide on the frame, having clamp-engaging means, actuating means for the slide, a knife carrier on the frame movable toward and from the frame, a plate at one end of the frame provided with a cutting edge, a cutter on the carrier cooperating with said plate to sever the clamp, and means for operating the knife by movement of the carrier.

2. A tool of the character described comprising a supporting frame, a clamp-engaging slide on the frame, a slide-actuating means, a shear plate on the frame adjacent an end thereof, the plate and the frame being beveled toward the frame-end in converging relation, and a shear knife carried by the frame, in cooperative relation to the shear plate.

3. A hose clamp tool comprising a supporting frame having a slot with parallel slides, a slide mounted in the slot having clamp engaging means, a plate at one end of the frame provided with a cutting edge, a cutter mounted on the frame and movable toward and from the frame cooperating with the plate to sever the clamp, means for moving the knife toward and from the frame, and actuating means for the slide.

4. A hose-clamp applying tool, comprising a slotted frame having an end beveled for rotative angular thrust engagement with a shoulder on the clamp, a clamp-engaging slide in the slot, mechanism for moving the slide to draw the clamp, a shear plate carried by the frame in spaced relation thereto to provide a clamp-cutting edge and defining a clamp-guiding passage between the frame and the plate, and a movable shearing knife on the frame cooperating with the shear plate to cut the tensioned clamp at a predetermined distance from the shoulder.

5. A hose-clamp applying tool, comprising a slotted frame having an end beveled for rotative angular thrust engagement with a shoulder on the clamp, a clamp-engaging slide in the slot, mechanism for moving the slide to draw the clamp, a shear plate carried by the frame in spaced relation thereto to provide a clamp-cutting edge and defining a clamp-guiding passage between the frame and the plate, a shearing knife movable toward and from the frame and cooperating with the shear plate to cut off the band while it is under tension around a hose, and a spring disposed to resist the cutting movement of the knife.

MICHAEL J. McANENY.